(12) United States Patent
Zhang

(10) Patent No.: US 10,485,009 B2
(45) Date of Patent: Nov. 19, 2019

(54) METHOD AND DEVICE IN UE AND BASE STATION USD FOR WIRELESS COMMUNICATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/025,850

(22) Filed: Jul. 2, 2018

(65) Prior Publication Data
US 2019/0014587 A1    Jan. 10, 2019

(30) Foreign Application Priority Data
Jul. 5, 2017    (CN) ........................... 2017 1 0543588

(51) Int. Cl.
*H04W 72/12*    (2009.01)
*H04L 1/00*    (2006.01)
*H04W 72/04*    (2009.01)

(52) U.S. Cl.
CPC ........... *H04W 72/12* (2013.01); *H04L 1/0038* (2013.01); *H04L 1/0046* (2013.01); *H04L 1/0072* (2013.01); *H04W 72/04* (2013.01)

(58) Field of Classification Search
CPC .... H04W 72/12; H04W 72/04; H04L 1/0038; H04L 1/0046; H04L 1/0072
See application file for complete search history.

(56) References Cited

U.S. PATENT DOCUMENTS

| | | | |
|---|---|---|---|
| 2018/0027554 A1* | 1/2018 | Yerramalli | H04L 1/1825 370/329 |
| 2018/0167164 A1* | 6/2018 | Lin | H04L 1/1845 |
| 2018/0212732 A1* | 7/2018 | You | H04L 5/0051 |
| 2018/0376492 A1* | 12/2018 | Wong | H04L 1/0046 |
| 2019/0036589 A1* | 1/2019 | Ren | H04W 72/04 |
| 2019/0124536 A1* | 4/2019 | Saito | H04B 7/0617 |

\* cited by examiner

*Primary Examiner* — Phong La
(74) *Attorney, Agent, or Firm* — Maschoff Brennan

(57) ABSTRACT

The present disclosure provides a method and a device in a User Equipment (UE) and a base station used for wireless communication. The UE in sequence receives a first radio signal in a first time interval, conducts blind decoding for the first radio signal in a second time interval and receives a second radio signal in a third time interval, and receives a third radio signal in a fourth time interval. The second radio signal and the third radio signal are transmitted by the same antenna port. The end time of the second time interval is behind the start time of the third time interval, and the fourth time interval is behind the third time interval. The present disclosure reduces the delay in beam scheduling, improves the efficiency of transmission and improves the flexibility of system scheduling.

16 Claims, 11 Drawing Sheets

METHOD AND DEVICE IN UE AND BASE STATION USD FOR WIRELESS COMMUNICATION

CROSS REFERENCE TO RELATED APPLICATION

This application claims the priority benefit of Chinese Patent Application Serial Number 201710543588.9, filed on Jul. 5, 2017, the full disclosure of which is incorporated herein by reference.

BACKGROUND

Technical Field

The present disclosure relates to transmission schemes of radio signals in wireless communication systems, and in particular to a method and a device for multi-antenna transmission.

Related Art

Massive Multi-Input Multi-Output (MIMO) becomes one research hotspot of next-generation mobile communications. In the massive MIMO, multiple antennas experience beamforming to form a relatively narrow beam which points to a particular direction to improve the quality of communication. Analog beamforming is applied to the massive MIMO system to obtain massive antenna array gain with less radio frequency links. The application of analog beamforming has a restriction that the receiving equipment first selects an analog beam and then uses the selected analog beam to receive a radio signal.

In 3rd Generation Partner Project (3GPP) New Radio discussion, there is some company proposing to use different analog beams to transmit a Physical Downlink Shared Channel (PDSCH) and a Physical Downlink Control Channel (PDCCH), thereby increasing the antenna array gain for PDSCH and improving the throughput of cell.

SUMMARY

The inventor finds through research that, if the PDCCH in a current subframe is used to indicate an analog receiving beam for the PDSCH behind a few subframes, the flexibility of system scheduling will be limited, and that, if the PDCCH in a current subframe is used to indicate an analog beam for the PDSCH in the current subframe, due to the delay in the channel decoding of the PDCCH, a User Equipment (UE) cannot use the PDSCH receiving beam indicated by the PDCCH to receive the PDSCH in the current subframe within the decoding time. Therefore, how to make effective use of the decoding time to receive a radio signal is an urgent problem to be solved.

In view of the above problems, the present disclosure provides a solution. It should be noted that the embodiments of the present disclosure and the characteristics in the embodiments may be mutually combined if there is no conflict. For example, the embodiments of the UE of the present disclosure and the characteristics in the embodiments may be applied to the base station, and vice versa.

The present disclosure provides a method in a UE used for wireless communication. The method includes the following steps:

receiving a first radio signal in a first time interval;

conducting blind decoding for the first radio signal in a second time interval, and receiving a second radio signal in a third time interval; and receiving a third radio signal in a fourth time interval.

Herein, the blind decoding for the first radio signal is used for recovering a first signaling, the multi-antenna related receiving for the second radio signal does not depend on the correct decoding of the first radio signal, the second radio signal and the third radio signal are transmitted by same antenna ports, the first signaling is used for determining first scheduling information, the first scheduling information is shared by the second radio signal and the third radio signal, the first scheduling information includes at least one of {MCS (Modulation Coding Scheme), occupied time-frequency resource, retransmission procedure number, redundancy version, new data indicator, transmitting antenna port}, the end time of the second time interval is behind the start time of the third time interval, and the fourth time interval is behind the third time interval.

In one embodiment, the above method is advantageous in that, while the flexibility of system scheduling is guaranteed, the decoding time of the first radio signal is effectively utilized to receive the second radio signal.

In one embodiment, the first time interval, the third time interval and the fourth time interval include a time resource occupied by a positive integer number of multicarrier symbols, respectively.

In one embodiment, the first time interval is preconfigured.

In one embodiment, the decoding capability of the UE is used for determining the second time interval.

In one embodiment, the third time interval is preconfigured.

In one embodiment, the third time interval is determined by the UE.

In one embodiment, the first scheduling information is used for determining the fourth time interval.

In one embodiment, the first radio signal, the second radio signal and the third radio signal include a positive integer number of multicarrier symbols respectively.

In one embodiment, the multicarrier symbol is an Orthogonal Frequency Division Multiplexing (OFDM) symbol.

In one embodiment, the multicarrier symbol is a Discrete Fourier Transform Spread OFDM (DFT-s-OFDM) symbol.

In one embodiment, the first radio signal is a PDCCH.

In one embodiment, the first radio signal includes a PDSCCH.

In one embodiment, the first radio signal includes a UE specific PDCCH.

In one embodiment, the first radio signal includes a group specific PDCCH.

In one embodiment, the third radio signal includes a PDSCH.

In one embodiment, the second radio signal and the third radio signal include a PDSCH.

In one embodiment, the third radio signal is a PDSCH.

In one embodiment, the second radio signal and the third radio signal are a PDSCH.

In one embodiment, a bit block is used for generating the second radio signal and the third radio signal.

In one embodiment, a data block is used for generating the second radio signal and the third radio signal.

In one embodiment, the second radio signal and the third radio signal are used for recovering a data block.

In one embodiment, a demodulation result of the second radio signal and a demodulation result of the third radio signal serve as an input of a channel demodulation module to recover a data block. At least one bit of the data block is related to both the second radio signal and the third radio signal.

In one embodiment, the first radio signal, the second radio signal and the third radio signal are in the same time unit.

In one embodiment, the time unit is a subframe.

In one embodiment, the time unit is a time slot.

In one embodiment, a Downlink Control Information (DCI) is used for generating the first radio signal.

In one embodiment, the first signaling is a DCI.

In one embodiment, the first signaling is used for generating the first radio signal.

In one embodiment, the first signaling generates the first radio signal after being encoded by a physical control channel.

In one embodiment, the blind decoding refers that the UE decodes one or more multicarrier symbols based on multiple candidate resource configurations; before successful decoding, it is indeterminate whether information is transmitted.

In one embodiment, the blind decoding refers that the UE decodes one or more multicarrier symbols based on the configuration of a search space; before successful decoding, it is indeterminate whether information is transmitted.

In one embodiment, the multi-antenna related receiving refers to a beamforming vector.

In one embodiment, the multi-antenna related receiving refers to an analog receiving beamforming vector.

In one embodiment, the multi-antenna related receiving refers to a hybrid receiving beamforming vector.

In one embodiment, the multi-antenna related receiving refers to employing the same receiving beam used for receiving a target reference signal.

In one embodiment, the analog receiving beamforming vector of the second radio signal is preconfigured.

In one embodiment, the analog receiving beamforming vector used for receiving the first radio signal is used for receiving the second radio signal.

In one embodiment, the first radio signal and the target reference signal are related spatially, and the receiving beam used for receiving the target reference signal is used for receiving the first radio signal and the second radio signal.

In one embodiment, being related spatially refers to being Quasi Co-Located (QCL) spatially.

In one embodiment, being related spatially refers that large-scale channel characteristics are the same.

In one embodiment, the large-scale channel characteristic includes at least one of delay spread, Doppler spread, angle spread, statistical value of angle of arrival, and statistical value of angle of departure.

In one embodiment, two radio signals being related spatially refers that the same transmitting beam and the same receiving beam are used for transmitting and receiving the two radio signals.

In one embodiment, two radio signals being related spatially refers that the same analog transmitting beamforming vector and the same analog receiving beamforming vector are used for transmitting and receiving the two radio signals.

In one embodiment, the PDCCH before the first radio signal in time domain is used for determining the analog receiving beamforming vector used for receiving the second radio signal, N is a positive integer.

In one embodiment, the PDCCH before N subframes is used for determining the analog receiving beamforming vector used for receiving the second radio signal, N is a positive integer.

In one embodiment, the antenna port is formed by superposition of multiple physical antennas through antenna virtualization. Mapping coefficients of the antenna port to the multiple physical antennas compose a beamforming vector, which is used for the antenna virtualization to form a beam.

In one embodiment, different reference signals correspond to different antenna ports.

In one embodiment, the same DMRS is used for demodulating the second radio signal and the third radio signal.

In one embodiment, the same analog transmitting beam vector is used for transmitting the second radio signal and the third radio signal.

In one embodiment, the same precoding vector is used for generating the second radio signal and the third radio signal.

In one embodiment, the first scheduling information is used for demodulating and decoding the PDSCH in the second radio signal and the third radio signal.

In one embodiment, the same Modulation Coding Scheme (MCS) is used for generating the second radio signal and the third radio signal.

In one embodiment, the first scheduling information indicates the time-frequency resource occupied by the PDSCH in the second radio signal and the third radio signal.

In one embodiment, the first scheduling information is used for retransmitting and merging the data on the PDSCH in the second radio signal and the third radio signal.

In one embodiment, the first scheduling information indicates that the second radio signal and the third radio signal are used for recovering a new data block.

In one embodiment, the first scheduling information indicates the DMRS corresponding to the second radio signal and the third radio signal.

According to one aspect of the present disclosure, the first signaling is used for determining the multi-antenna related receiving for the third radio signal.

In one embodiment, the first signaling is used for indicating explicitly the multi-antenna related receiving for the third radio signal.

In one embodiment, the first signaling is used for indicating implicitly the multi-antenna related receiving for the third radio signal.

In one embodiment, the multi-antenna related receiving refers to receiving beamforming.

In one embodiment, the multi-antenna related receiving refers to selection of a receiving antenna.

In one embodiment, the first signaling is used for determining an analog receiving beamforming vector used for receiving the third radio signal.

In one embodiment, the first signaling is used for determining a target reference signal which is related spatially to the DMRS used for demodulating the third radio signal, and an analog beamforming vector used for receiving the target reference signal is used for receiving the third radio signal.

In one embodiment, being related spatially refers to being QCL spatially.

In one embodiment, the target reference signal is a Channel State Information Reference Signal (CSI-RS).

In one embodiment, the target reference signal is a Synchronization Signal (SS).

According to one aspect of the present disclosure, the method includes the following steps:

receiving a target radio signal; and transmitting a fourth radio signal.

Herein, the channel measurement for the target radio signal is used for triggering the fourth radio signal; and the fourth radio signal is used for determining the multi-antenna related transmitting for the first radio signal.

In one embodiment, the above method is advantageous in that the delay in the transmitting of the configuration information responding to beam replacement is reduced.

In one embodiment, if the result of the channel measurement for the target radio signal is less than a target threshold, the transmission of the fourth radio signal is triggered; otherwise, the transmission of the fourth radio signal is not triggered.

In one embodiment, if the fourth radio signal is not transmitted, the first receiving beam is used for receiving the radio signal transmitted within the second time interval; if the fourth radio signal is transmitted, the second receiving beam is used for receiving the second radio signal; the first receiving beam and the second receiving beam are two different receiving beams.

In one embodiment, the first receiving beam is a receiving beam used for receiving a third reference signal, the second receiving beam is a receiving beam used for receiving a fourth reference signal, and the third reference signal and the fourth reference signal are two different reference signals.

In one embodiment, the PDCCH before the first time interval in time domain is used for determining the first receiving beam.

In one embodiment, the fourth radio signal is a beam recovery request.

In one embodiment, the first radio signal is a response to the beam recovery request.

In one embodiment, the UE assumes that the first radio signal, the second radio signal and the third radio signal are transmitted within the first time window after the fourth radio signal is transmitted.

In one embodiment, the first time slot, the second time slot, the third time slot and the fourth time slot are within the first time window, and the start time of the first time window is behind the fourth radio signal.

In one embodiment, the result of the channel measurement includes a Signal-to-Interference-and-Noise Ratio (SINR).

In one embodiment, the result of the channel measurement includes a Signal-to-Noise Ratio (SNR).

In one embodiment, the target radio signal is a PDCCH.

In one embodiment, the target radio signal is a DMRS.

In one embodiment, the target radio signal is a CSI-RS.

In one embodiment, the target radio signal is an SS.

In one embodiment, the target radio signal is used for conducting a channel measurement for the target channel; if the result of the channel measurement is less than a target threshold, the transmission of the fourth radio signal is triggered; otherwise, the transmission of the fourth radio signal is not triggered.

In one embodiment, the result of the channel measurement includes a Block Error Rate (BLER) corresponding to the target channel.

In one embodiment, the target radio signal is a CSI-RS, and the channel measurement refers to a BLER calculation after the received CSI-RS is mapped to the target channel.

In one embodiment, the target channel is a PDCCH.

In one embodiment, the target channel is a PDSCH.

In one embodiment, the fourth radio signal is a PUCCH.

In one embodiment, a first signature sequence is used for generating the fourth radio signal, the first signature sequence is one of Q candidate sequences, and Q is a positive integer greater than 1.

In one embodiment, the fourth radio signal is transmitted on a time-domain resource of PRACH.

In one embodiment, the fourth radio signal indicates explicitly the multi-antenna related transmitting for the first radio signal.

In one embodiment, the fourth radio signal indicates implicitly the multi-antenna related transmitting for the first radio signal.

In one embodiment, a first bit block is used for generating the fourth radio signal, and the value of the first bit block indicates the multi-antenna related receiving of the first radio signal.

In one embodiment, an air interface resource occupied by the fourth radio signal is used for indicating the multi-antenna related transmitting of the first radio signal.

In one embodiment, the air interface resource is at least one of time-domain resource, frequency-domain resource and code-domain resource.

In one embodiment, the multi-antenna related transmitting of the first radio signal refers to an analog transmitting beamforming vector used for the first radio signal.

In one embodiment, the multi-antenna related receiving of the first radio signal is related to the fourth radio signal.

In one embodiment, the multi-antenna related receiving of the first radio signal is a receiving beamforming vector.

In one embodiment, the multi-antenna related receiving of the first radio signal is an analog receiving beamforming vector.

In one embodiment, the multi-antenna related receiving of the first radio signal is a hybrid receiving beamforming vector generated by an analog receiving beamforming vector and a digital receiving beamforming vector.

In one embodiment, the fourth radio signal is used for determining the third reference signal, and the third reference signal is related to the first radio signal spatially.

In one embodiment, the analog transmitting beamforming vector used for the first radio signal is the same as the analog transmitting beamforming vector used for the third reference signal.

In one embodiment, the analog receiving beamforming vector used for the third reference signal is used by the UE to receive the first radio signal.

According to one aspect of the present disclosure, wherein the multi-antenna related receiving for the second radio signal is related to the multi-antenna related receiving for the first radio signal.

In one embodiment, the above method is advantageous in that the delay in receiving is reduced.

In one embodiment, the same analog receiving beamforming vector is used for receiving the second radio signal and the first radio signal.

In one embodiment, different analog transmitting beamforming vectors are used for transmitting the second radio signal and the first radio signal respectively.

In one embodiment, the same analog transmitting beamforming vectors is used for transmitting the second radio signal and the first radio signal.

In one embodiment, the DMRS used for demodulating the first radio signal is related to the third reference signal spatially, and the analog receiving beamforming vector used for receiving the third reference signal is used for receiving the first radio signal and the second radio signal.

In one embodiment, the multi-antenna related receiving for the third radio signal is also related to the multi-antenna related receiving for the first radio signal.

In one embodiment, the analog receiving beamforming vector used for receiving the third reference signal is used for receiving the first radio signal, the second radio signal and the third radio signal.

In one embodiment, the analog transmitting beamforming vector used for transmitting the third reference signal is used for transmitting the first radio signal, the second radio signal and the third radio signal.

According to one aspect of the present disclosure, the multi-antenna related receiving refers to a receiving beamforming vector.

In one embodiment, the receiving beamforming vector is an analog beamforming vector.

In one embodiment, the receiving beamforming vector is a hybrid beamforming vector generated by an analog beamforming vector and a digital beamforming vector.

In one embodiment, the receiving beamforming vector refers to one receiving beamforming vector.

In one embodiment, the receiving beamforming vector refers to multiple receiving beamforming vectors.

In one embodiment, the multiple receiving beamforming vectors are used for the multi-antenna related receiving simultaneously.

According to one aspect of the present disclosure, the multi-antenna related receiving for the second radio signal differs from the multi-antenna related receiving for the third radio signal, and the receiving beamforming vector for the third radio signal is used for processing the received second radio signal.

In one embodiment, the above method is advantageous in that the transmission efficiency of the default receiving scheme is improved.

In one embodiment, the receiving beamforming vector used for receiving the second radio signal is used for processing the received second radio signal.

In one embodiment, the receiving beamforming vector for the third radio signal and the receiving beamforming vector for the second radio signal are used for generating a first processing vector, the first processing vector is used for processing the received second radio signal, and the processing result is demodulated and decoded based on a receiving result of a reference signal transmitted simultaneous with the third radio signal.

In one embodiment, the receiving beamforming vector is a row vector and is used for a first radio frequency link, the receiving beamforming vector for the third radio signal is subjected to conjugate transpose to obtain a second vector, the receiving beamforming vector for the second radio signal is multiplied by the second vector to obtain a first scalar number, the output of the first radio frequency link for the second radio signal is divided by the first scalar number to obtain a second scalar number, and the second scalar number is used for demodulation and decoding.

According to one aspect of the present disclosure, antenna ports used for transmitting the first radio signal, the second radio signal and the third radio signal are all related to a first reference signal spatially, the first reference signal is used for determining the multi-antenna related transmitting and receiving for the first radio signal, the second radio signal and the third radio signal.

In one embodiment, the above method is advantageous in that the delay in receiving is reduced, the complexity of processing is reduced, and the overhead of signaling is reduced.

In one embodiment, the DMRS used for demodulating the first radio signal, the second radio signal and the third radio signal are related to the first reference signal spatially.

In one embodiment, the fourth radio signal is used for determining that: the DMRS used for demodulating the first radio signal, the second radio signal and the third radio signal are related to the first reference signal spatially.

In one embodiment, the fourth radio signal is used for determining the first reference signal.

In one embodiment, if the fourth radio signal is not transmitted, the first receiving beam is used for receiving the radio signal transmitted within the second time interval; if the fourth radio signal is transmitted, the second receiving beam is used for receiving the second radio signal; the first receiving beam and the second receiving beam are two different receiving beams. The first receiving beam is a receiving beam used for receiving a third reference signal, the second receiving beam is a receiving beam used for receiving the first reference signal, and the third reference signal and the first reference signal are two different reference signals.

In one embodiment, a Radio Resource Control (RRC) signaling is used for determining the first reference signal.

In one embodiment, a physical layer control signaling is used for determining the first reference signal.

In one embodiment, two reference signals being related spatially refers that the two reference signals are QCL spatially.

In one embodiment, the first reference signal is a CSI-RS.

In one embodiment, the first reference signal is an SS.

In one embodiment, the analog transmitting beamforming vector used for transmitting the first reference signal is used for transmitting the first radio signal, the second radio signal and the third radio signal.

In one embodiment, the analog receiving beamforming vector used for receiving the first reference signal is used for receiving the first radio signal, the second radio signal and the third radio signal.

In one embodiment, the analog transmitting beamforming vector used for transmitting the first reference signal is used for transmitting respective DMRSs corresponding to the first radio signal, the second radio signal and the third radio signal.

In one embodiment, the analog receiving beamforming vector used for receiving the first reference signal is used for receiving respective DMRSs corresponding to the first radio signal, the second radio signal and the third radio signal.

According to one aspect of the present disclosure, the antenna port used for transmitting the first radio signal is related to the first reference signal spatially, the antenna ports used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

In one embodiment, the above method is advantageous in that the antenna array gain and the scheduling flexibility for transmitting the PDSCH are improved.

In one embodiment, the above method is advantageous in that different Transmit-Receive Points (TRPs) can be used for transmitting a control channel and a data channel respectively.

In one embodiment, the first reference signal and the second reference signal are not related spatially.

In one embodiment, different transmitting beams are used for transmitting the first reference signal and the second reference signal.

In one embodiment, different receiving beams are used for receiving the first reference signal and the second reference signal.

In one embodiment, the transmitting beam used for transmitting the first reference signal is used for transmitting the first radio signal.

In one embodiment, the receiving beam used for receiving the first reference signal is used for receiving the first radio signal.

In one embodiment, the receiving beam used for receiving the first reference signal is used for receiving the second radio signal, and the receiving beam used for receiving the second reference signal is not used for receiving the second radio signal.

In one embodiment, the transmitting beam used for transmitting the second reference signal is used for transmitting the second radio signal and the third radio signal.

In one embodiment, the receiving beam used for receiving the second reference signal is used for receiving the third radio signal.

The present disclosure provides a method in a base station device used for wireless communication. The method includes the following steps:

transmitting a first radio signal in a first time interval;
transmitting a second radio signal in a third time interval; and
transmitting a third radio signal in a fourth time interval.

Herein, a receiver of the first radio signal conducts blind decoding for the first radio signal in a second time interval, the blind decoding for the first radio signal is used for recovering a first signaling, the multi-antenna related receiving for the second radio signal does not depend on the correct decoding of the first radio signal, the second radio signal and the third radio signal are transmitted by the same antenna port, the first signaling is used for determining first scheduling information, the first scheduling information is shared by the second radio signal and the third radio signal, the first scheduling information includes at least one of {MCS, occupied time-frequency resource, retransmission procedure number, redundancy version, new data indicator, transmitting antenna port}, the end time of the second time interval is behind the start time of the third time interval, and the fourth time interval is behind the third time interval.

In one embodiment, the first radio signal includes a UE specific PDCCH.

In one embodiment, the first radio signal includes a group specific PDCCH.

In one embodiment, the second radio signal and the third radio signal carry an RRC signaling.

According to one aspect of the present disclosure, the first signaling is used for determining the multi-antenna related receiving for the third radio signal.

In one embodiment, a first DCI is used for generating the first signaling, and the first DCI indicates a receiving beam used for receiving the third radio signal.

In one embodiment, the first DCI indicates a target reference signal QCL with the third radio signal, and the receiving beam used for receiving the target reference signal is used for receiving the third radio signal.

In one embodiment, the first DCI indicates a first index value, and the first index value is an index of a receiving beam used for receiving the third radio signal in a preconfigured receiving beam pool.

According to one aspect of the present disclosure, the method includes the following steps:

transmitting a target radio signal; and
receiving a fourth radio signal.

Herein, the channel measurement for the target radio signal is used for triggering the fourth radio signal; and the fourth radio signal is used for determining the multi-antenna related transmitting for the first radio signal.

According to one aspect of the present disclosure, the multi-antenna related receiving for the second radio signal is related to the multi-antenna related receiving for the first radio signal.

In one embodiment, the same transmitting beam is used for transmitting the second radio signal and the first radio signal.

In one embodiment, different transmitting beams are used for transmitting the first radio signal and the second radio signal.

In one embodiment, the same transmitting beam is used for transmitting the DMRS corresponding to the second radio signal and the DMRS corresponding to the first radio signal.

In one embodiment, different transmitting beams are used for transmitting the DMRS corresponding to the first radio signal and the DMRS corresponding to the second radio signal.

In one embodiment, the base station device transmits the first radio signal, the second radio signal and the third radio signal within the first time window after receiving the fourth radio signal.

According to one aspect of the present disclosure, the multi-antenna related receiving refers to a receiving beamforming vector.

According to one aspect of the present disclosure, the multi-antenna related receiving for the second radio signal differs from the multi-antenna related receiving for the third radio signal, and the receiving beamforming vector for the third radio signal is used for processing the received second radio signal.

In one embodiment, the multi-antenna related transmitting for the second radio signal is the same as the multi-antenna related transmitting for the third radio signal.

In one embodiment, the same analog transmitting beamforming vector is used for transmitting the second radio signal and the first radio signal.

According to one aspect of the present disclosure, antenna ports used for transmitting the first radio signal, the second radio signal and the third radio signal are all related to a first reference signal spatially, the first reference signal is used for determining the multi-antenna related transmitting and receiving for the first radio signal, the second radio signal and the third radio signal.

In one embodiment, a transmitting beam used for transmitting the first reference signal is used for transmitting the first radio signal, the second radio signal and the third radio signal.

In one embodiment, a transmitting beamforming vector used for transmitting the first reference signal is used for transmitting the first radio signal, the second radio signal and the third radio signal.

According to one aspect of the present disclosure, the antenna port used for transmitting the first radio signal is related to the first reference signal spatially, the antenna ports used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

In one embodiment, a transmitting beam used for transmitting the first reference signal is used for transmitting the first radio signal and the second radio signal.

In one embodiment, a transmitting beam used for transmitting the second reference signal is used for transmitting the third radio signal.

The present disclosure provides a UE used for wireless communication. The UE includes the following modules:

a first receiver module, to receive a first radio signal in a first time interval;

a first transceiver module, to conduct blind decoding for the first radio signal in a second time interval and receive a second radio signal in a third time interval; and a second receiver module, to receive a third radio signal in a fourth time interval.

Herein, the blind decoding for the first radio signal is used for recovering a first signaling, the multi-antenna related receiving for the second radio signal does not depend on the correct decoding of the first radio signal, the second radio signal and the third radio signal are transmitted by the same antenna port, the first signaling is used for determining first scheduling information, the first scheduling information is shared by the second radio signal and the third radio signal, the first scheduling information includes at least one of {MCS, occupied time-frequency resource, retransmission procedure number, redundancy version, new data indicator, transmitting antenna port}, the end time of the second time interval is behind the start time of the third time interval, and the fourth time interval is behind the third time interval.

In one embodiment, the above UE is characterized in that the first signaling is used for determining the multi-antenna related receiving for the third radio signal.

In one embodiment, the above UE is characterized in that the first transceiver module is further configured to receive a target radio signal and transmit a fourth radio signal; wherein the channel measurement for the target radio signal is used for triggering the fourth radio signal, and the fourth radio signal is used for determining the multi-antenna related transmitting for the first radio signal.

In one embodiment, the above UE is characterized in that the multi-antenna related receiving for the second radio signal is related to the multi-antenna related receiving for the first radio signal.

In one embodiment, the above UE is characterized in that the multi-antenna related receiving refers to a receiving beamforming vector.

In one embodiment, the above UE is characterized in that the multi-antenna related receiving for the second radio signal differs from the multi-antenna related receiving for the third radio signal, and the receiving beamforming vector for the third radio signal is used for processing the received second radio signal.

In one embodiment, the above UE is characterized in that antenna ports used for transmitting the first radio signal, the second radio signal and the third radio signal are all related to a first reference signal spatially, the first reference signal is used for determining the multi-antenna related transmitting and receiving for the first radio signal, the second radio signal and the third radio signal.

In one embodiment, the above UE is characterized in that the antenna port used for transmitting the first radio signal is related to the first reference signal spatially, the antenna ports used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

The present disclosure provides a base station device used for wireless communication. The base station device includes the following modules:

a first transmitter module, to transmit a first radio signal in a first time interval;

a second transceiver module, to transmit a second radio signal in a third time interval; and a second transmitter module, to transmit a third radio signal in a fourth time interval.

Herein, a receiver of the first radio signal conducts blind decoding for the first radio signal in a second time interval, the blind decoding for the first radio signal is used for recovering a first signaling, the multi-antenna related receiving for the second radio signal does not depend on the correct decoding of the first radio signal, the second radio signal and the third radio signal are transmitted by the same antenna port, the first signaling is used for determining first scheduling information, the first scheduling information is shared by the second radio signal and the third radio signal, the first scheduling information includes at least one of {MCS, occupied time-frequency resource, retransmission procedure number, redundancy version, new data indicator, transmitting antenna port}, the end time of the second time interval is behind the start time of the third time interval, and the fourth time interval is behind the third time interval.

In one embodiment, the above base station device is characterized in that the first signaling is used for determining the multi-antenna related receiving for the third radio signal.

In one embodiment, the above base station device is characterized in that the second transceiver module is further configured to transmit a target radio signal and receive a fourth radio signal; wherein the channel measurement for the target radio signal is used for triggering the fourth radio signal, and the fourth radio signal is used for determining the multi-antenna related transmitting for the first radio signal.

In one embodiment, the above base station device is characterized in that the multi-antenna related receiving for the second radio signal is related to the multi-antenna related receiving for the first radio signal.

In one embodiment, the above base station device is characterized in that the multi-antenna related receiving refers to a receiving beamforming vector.

In one embodiment, the above base station device is characterized in that the multi-antenna related receiving for the second radio signal differs from the multi-antenna related receiving for the third radio signal, and the receiving beamforming vector for the third radio signal is used for processing the received second radio signal.

In one embodiment, the above base station device is characterized in that antenna ports used for transmitting the first radio signal, the second radio signal and the third radio signal are all related to a first reference signal spatially, the first reference signal is used for determining the multi-antenna related transmitting and receiving for the first radio signal, the second radio signal and the third radio signal.

In one embodiment, the above base station device is characterized in that the antenna port used for transmitting the first radio signal is related to the first reference signal spatially, the antenna ports used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

In one embodiment, compared with the prior art, the present disclosure has the following technical advantages:
the delay in beam scheduling is reduced;
the efficiency of transmission is improved; and
the flexibility of system scheduling is increased.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the application and the characteristics of the embodiments may be arbitrarily combined if there is no conflict.

Embodiment 1

Figure 1:
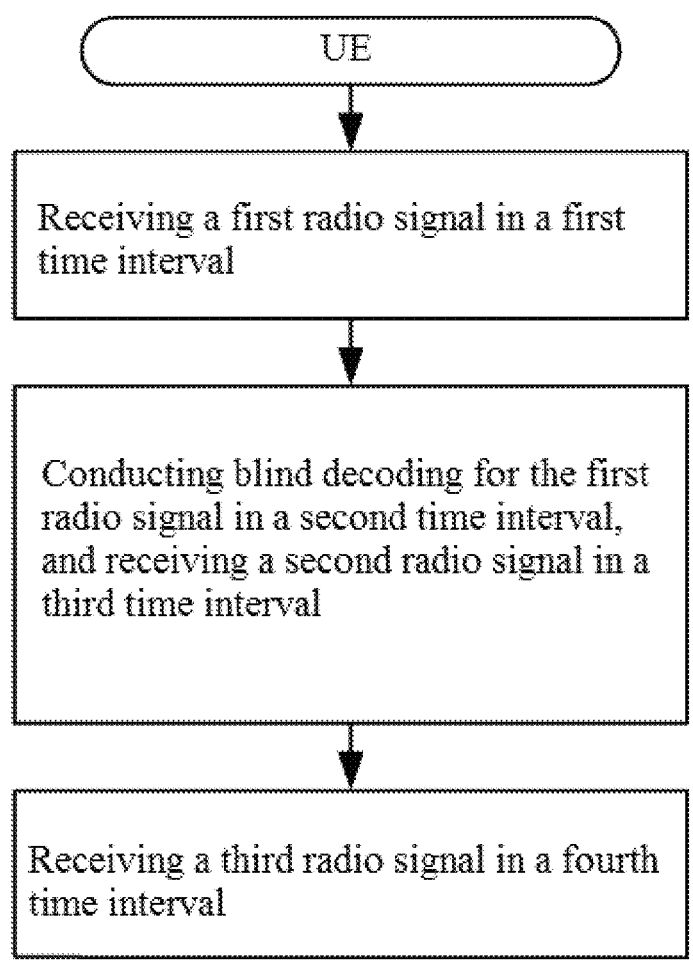
FIG. 1 is a flowchart according to one embodiment of the present disclosure.

Embodiment 1 illustrates an example of a flowchart according to the present disclosure, as shown in FIG. 1. In FIG. 1, each box represents one step.

In Embodiment 1, the UE in the present disclosure in sequence receives a first radio signal in a first time interval, conducts blind decoding for the first radio signal in a second time interval and receives a second radio signal in a third time interval, and receives a third radio signal in a fourth time interval. The blind decoding for the first radio signal is used for recovering a first signaling, the multi-antenna related receiving for the second radio signal does not depend on the correct decoding of the first radio signal, the second radio signal and the third radio signal are transmitted by the same antenna port, the first signaling is used for determining first scheduling information, the first scheduling information is shared by the second radio signal and the third radio signal, the first scheduling information includes at least one of {MCS, occupied time-frequency resource, retransmission procedure number, redundancy version, new data indicator, transmitting antenna port}, the end time of the second time interval is behind the start time of the third time interval, and the fourth time interval is behind the third time interval.

In one subembodiment, the first radio signal is an OFDM symbol in which the PDCCH is located.

In one subembodiment, the second radio signal and the third radio signal are OFDM symbols in which the PDCCH is located.

In one subembodiment, the multi-antenna related receiving refers to a receiving beam.

In one subembodiment, the multi-antenna related receiving refers to a receiving beamforming vector used for forming a receiving beam.

In one subembodiment, the second radio signal and the third radio signal experience the same multi-antenna precoding operation.

In one subembodiment, the same transmitting beam is used for transmitting the second radio signal and the third radio signal.

In one subembodiment, the UE receives a target radio signal and transmits the fourth radio signal in sequence before receiving the first radio signal; the channel measurement for the target radio signal is used for triggering the transmission of the fourth radio signal; and the fourth radio signal is used for determining the multi-antenna related transmitting for the first radio signal.

In one subembodiment, the result of the channel measurement for the target radio signal is less than a target threshold, thus, the transmission of the fourth radio signal is triggered.

In one subembodiment, the fourth radio signal is used for determining a transmitting beam for the first radio signal.

In one subembodiment, the fourth radio signal is used for determining the multi-antenna related receiving for the first radio signal, the second radio signal and the third radio signal.

In one subembodiment, the fourth radio signal is used for determining a receiving beam for the first radio signal, the second radio signal and the third radio signal.

In one subembodiment, the fourth radio signal is a beam recovery request, and the first radio signal is a response to the beam recovery request.

In one subembodiment, the second radio signal and the third radio signal carry an RRC signaling.

Embodiment 2

Figure 2:
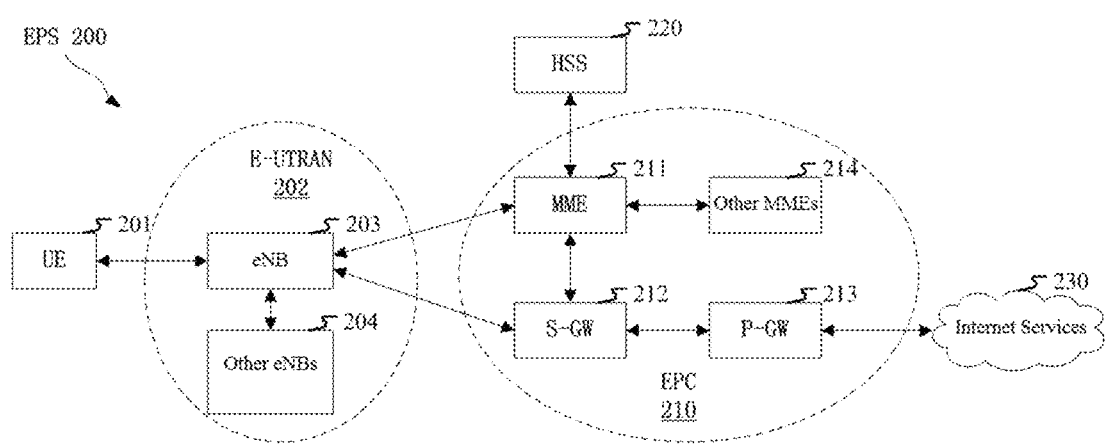
FIG. 2 is a diagram illustrating a network architecture according to one embodiment of the present disclosure.

Embodiment 2 illustrates an example of a diagram for a network architecture according to the present disclosure, as shown in FIG. 2. FIG. 2 is a diagram illustrating a system network architecture 200 of LTE, Long-Term Evolution Advanced (LTE-A) and NR 5G The LTE network architecture 200 may be called an Evolved Packet System (EPS)

200. The EPS 200 may include one or more UEs 201, an Evolution UMTS Terrestrial Radio Access Network (E-UTRAN) 202, an Evolved Packet Core (EPC) 210, a Home Subscriber Server (HSS) 220 and an Internet Service 230. Herein, the UMTS corresponds to Universal Mobile Telecommunications System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN includes an evolved node B (eNB) 203 and other eNBs 204. The eNB 203 provides UE 201 oriented user plane and control plane protocol terminations. The eNB 203 may be connected to other eNBs 204 via an Xn interface (for example, backhaul). The eNB 203 may be called a base station, a base transceiver station, a radio base station, a radio transceiver, a transceiver function, a Basic Service Set (BSS), an Extended Service Set (ESS), a TRP or other appropriate terms. The eNB 203 provides an access point of the EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or other appropriate terms. The eNB 203 is connected to the EPC 210 via an S1 interface. The EPC 210 includes a Mobility Management Entity (MME) 211, other MMEs 214, a Service Gateway (S-GW) 212 and a Packet Data Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the internet service 230. The internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the present disclosure.

In one subembodiment, the eNB 203 corresponds to the base station in the present disclosure.

In one subembodiment, the UE 201 supports multi-antenna transmission.

In one subembodiment, the UE 201 supports analog beamforming.

In one subembodiment, the eNB 203 supports multi-antenna transmission.

In one subembodiment, the eNB 203 supports analog beamforming.

Embodiment 3

Figure 3:
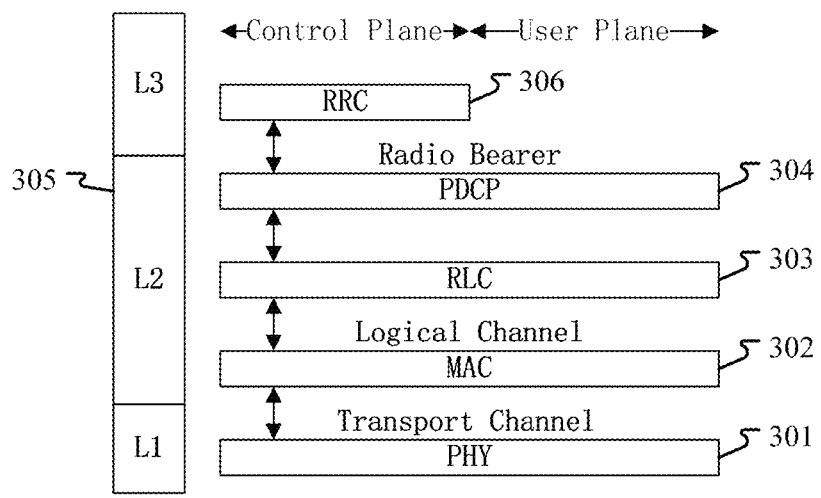
FIG. 3 is a diagram illustrating a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and an eNB is presented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the eNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers end at the eNB of the network side. Although not described in FIG. 3, the UE may include several higher layers above the L2 305, such as a network layer (i.e. IP layer) ending at a P-GW 213 of the network side and an application layer ending at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between eNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the eNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using a RRC signaling between the eNB and the UE.

In one subembodiment, the radio protocol architecture shown in FIG. 3 is applicable to the UE in the present disclosure.

In one subembodiment, the radio protocol architecture shown in FIG. 3 is applicable to the base station in the present disclosure.

In one subembodiment, the first radio signal in the present disclosure is generated by the PHY 301.

In one subembodiment, the first signaling in the present disclosure is generated by the PHY 301.

In one subembodiment, the second radio signal in the present disclosure is generated by the PHY 301.

In one subembodiment, the third radio signal in the present disclosure is generated by the PHY 301.

In one subembodiment, the fourth radio signal in the present disclosure is generated by the PHY 301.

In one subembodiment, the target radio signal in the present disclosure is generated by the PHY 301.

Embodiment 4

Figure 4:
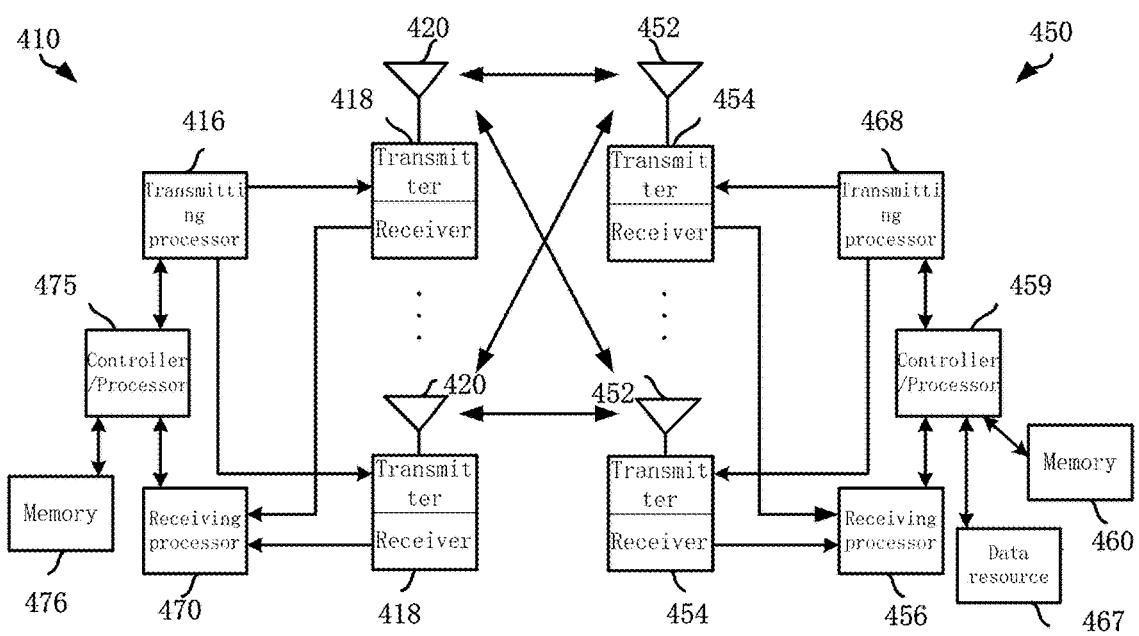
FIG. 4 is a diagram illustrating an evolved node B and a given UE according to one embodiment of the present disclosure.

Embodiment 4 illustrates a diagram of an eNB and a UE according to the present disclosure, as shown in FIG. 4.

FIG. 4 is a block diagram of an eNB 410 in communication with a UE 450 in an access network. In downlink transmission, a higher-layer packet coming from the core network is provided to a controller/processor 475. The controller/processor 475 provides functions of a layer 2. In downlink transmission, the controller/processor 475 provides header compression, encrypting, packet segmentation and reordering, multiplexing between a logical channel and a transport channel, and radio resource allocation for the UE 450 based on various priorities. The controller/processor 475 is also in charge of HARQ operation, retransmission of a lost packet, and a signaling to the UE 450. A transmitting processor 416 performs signal processing functions used for the layer 1. The signal processing function includes encoding and interleaving, so as to ensure an FEC (Forward Error Correction) and the mapping to signal clusters corresponding to each modulation scheme (i.e., BPSK, QPSK, M-PSK, M-QAM, etc.) at the UE 450 side. The encoded and modulated signals are divided into parallel streams. Each of the parallel streams is mapped into a subcarrier of multi-carriers, and is multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. The multi-carrier streams subject to spatial precoding to generate multiple spatial streams. Each spatial stream is provided to different antennas 420 via the transmitter 418. Every transmitter 418 is used to transmit a corresponding spatial stream modulation RF (Radio Frequency) carrier. At the UE 450 side, every receiver 454 receives a signal via a corresponding antenna 452. Every receiver 454 recovers information modulated to the RF carrier and provides the information to a receiving processor 456. The receiving processor 456 performs signal receiving processing functions of the layer 1. The receiving processor 456 performs spatial processing on the information to recover any spatial stream targeting the UE 450. If there are multiple spatial streams are targeting the UE 450, the multiple spatial streams can be assembled into a single multi-carrier symbol stream by the receiving processor 456. The receiving processor 456 then converts the multi-carrier symbol stream from time domain into frequency domain using FFT. A frequency domain signal includes a single multi-carrier symbol stream for each subcarrier of multi-carrier signals. The symbol and reference signal on each subcarrier are recovered and demodulated by determining the most possible signal cluster point transmitted by the eNB 410, and generate a soft decision. The soft decision is then decoded and de-interleaved so as to recover the original data and control signal transmitted by the eNB 410 on the physical channel. The data and control signal are then provided to a controller/processor 459. The controller/processor 459 performs functions of the layer 2. The controller/processor can be connected to a memory 460 that stores program code and data. The memory 460 is a computer readable media. In downlink transmission, the controller/processor 459 provides the de-multiplexing between the transport channel and the logical channel, packet reassembling, decrypting, header decompression, and control signaling processing so as to recover a higher-layer packet coming from the core network. The higher-layer packet is then provided to all the protocol layers above the layer 2, or various control signals can be provided to the layer 3 for processing. The controller/processor 459 can also perform error detection using ACK and/or NACK protocols to support the HARQ operation. In the uplink transmission, a data source 467 provides a higher-layer packet to the controller/processor 459. The data source 467 illustrates all the protocol layers above the layer 2. Similar as the function description of the eNB 410 in downlink transmission, the controller/processor 459 provides header compression, encrypting, packet segmentation and reordering, and multiplexing between a logical channel and a transport channel based on the radio resource allocation of the base station 410 so as to provide the functions of the layer 2 used for the control plane and user plane. The controller/processor 459 is in charge of HARQ operation, retransmission of a lost packet, and signaling to the eNB 410. A transmitting processor 468 selects appropriate encoding and modulation schemes to facilitate spatial processing. A spatial stream generated by the transmitting processor 468 is provided to different antennas 452 via a single transmitter 454. Each transmitter 454 is used to transmit a corresponding spatial stream modulation RF carrier. The uplink reception at the eNB 410 is similar as the function description of the receiver at the eNB 410. Every receiver 418 receives a signal via a corresponding antenna 420. Every receiver 418 recovers information modulated to the RF carrier, and provides the information to a receiving processor 470. The receiving processor 470 can provide functions of the layer 1. A controller/processor 475 can provide functions of the layer 2. The controller/processor 475 can be connected to a memory 476 that stores program code and data. The memory 476 is a computer readable media. In uplink transmission, the controller/processor 475 provides the de-multiplexing between the transport channel and the logical channel, packet reassembling, decrypting, header decompression, and control signal processing so as to recover a higher-layer packet coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor.

In one embodiment, the UE 450 includes a memory that stores a computer readable instruction program. The computer readable instruction program generates an action when executed by at least one processor. The action includes: receiving a first radio signal in a first time interval; conducting blind decoding for the first radio signal in a second time interval, and receiving a second radio signal in a third time interval; and receiving a third radio signal in a fourth time interval.

In one embodiment, the eNB 410 includes at least one processor and at least one memory. The at least one memory includes computer program codes. The at least one memory and the computer program codes are configured to be used in collaboration with the at least one processor.

In one embodiment, the eNB 410 includes a memory that stores a computer readable instruction program. The computer readable instruction program generates an action when executed by at least one processor. The action includes: transmitting a first radio signal in a first time interval; transmitting a second radio signal in a third time interval; and transmitting a third radio signal in a fourth time interval.

In one embodiment, the UE 450 corresponds to the UE in the present disclosure.

In one embodiment, the eNB 410 corresponds to the base station in the present disclosure.

In one embodiment, at least one of the transmitting processor 416 and the controller/processor 475 is used for transmitting the first radio signal in the present disclosure.

In one embodiment, at least one of the receiving processor 456 and the controller/processor 459 is used for receiving the first radio signal in the present disclosure.

In one embodiment, at least one of the transmitting processor 416 and the controller/processor 475 is used for transmitting the second radio signal in the present disclosure.

In one embodiment, at least one of the receiving processor 456 and the controller/processor 459 is used for receiving the second radio signal in the present disclosure.

In one embodiment, at least one of the transmitting processor 416 and the controller/processor 475 is used for transmitting the third radio signal in the present disclosure.

In one embodiment, at least one of the receiving processor 456 and the controller/processor 459 is used for receiving the third radio signal in the present disclosure.

In one embodiment, at least one of the transmitting processor 416 and the controller/processor 475 is used for transmitting the target radio signal in the present disclosure.

In one embodiment, at least one of the receiving processor 456 and the controller/processor 459 is used for receiving the target radio signal in the present disclosure.

In one embodiment, at least one of the transmitting processor 468 and the controller/processor 459 is used for transmitting the fourth radio signal in the present disclosure.

In one embodiment, at least one of the receiving processor 470 and the controller/processor 475 is used for receiving the fourth radio signal in the present disclosure.

Embodiment 5

Figure 5:
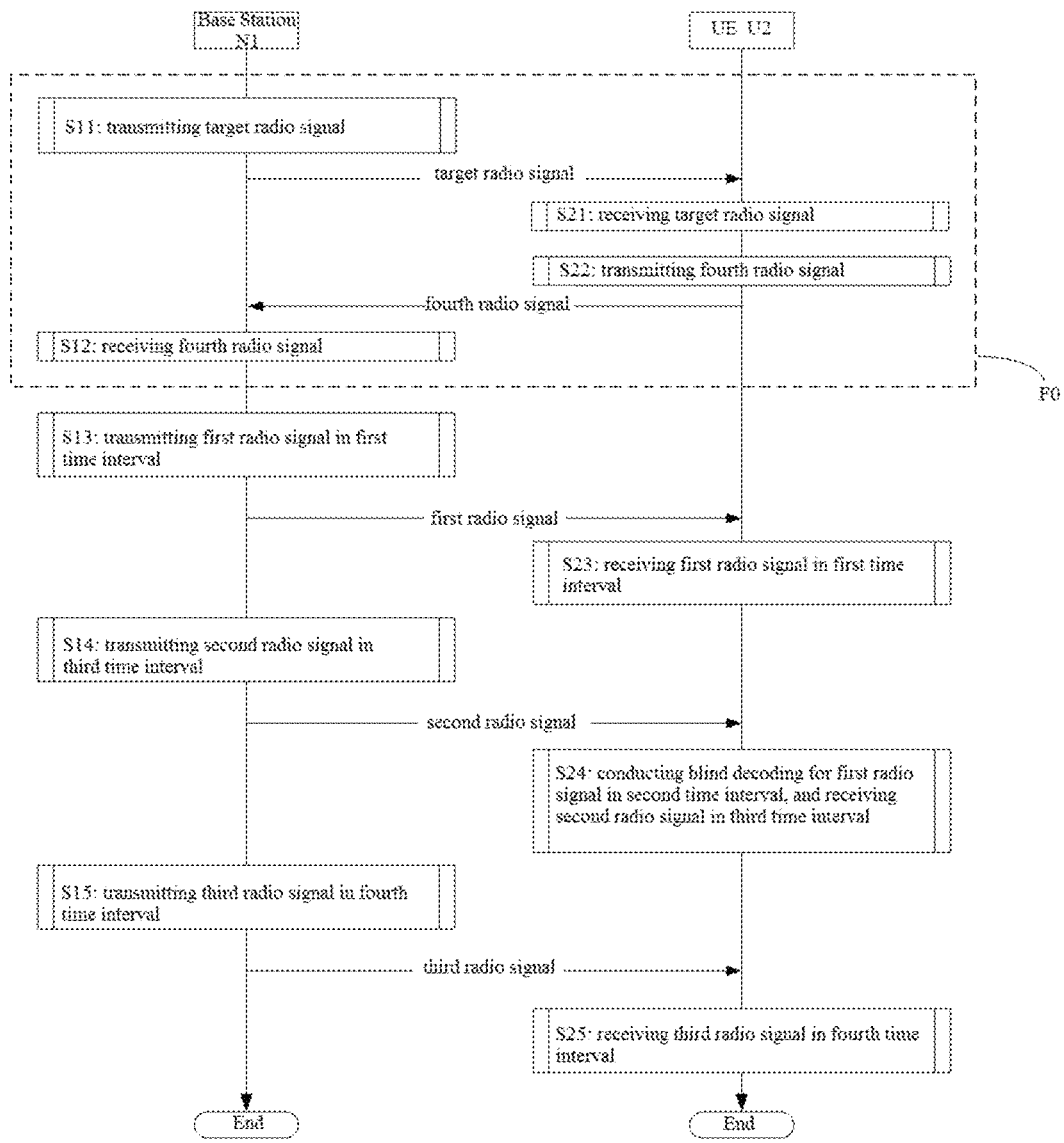
FIG. 5 is a flowchart illustrating the transmission of a radio signal according to one embodiment of the present disclosure.

Embodiment 5 illustrates an example of a flowchart for the transmission of a radio signal according to the present disclosure, as shown in FIG. 5. In FIG. 5, the base station N1 is a maintenance base station for a serving cell of the UE U2. Steps marked in the box F0 are optional.

The base station N1 transmits a target radio signal in S11, receives a fourth radio signal in S12, transmits a first radio signal in a first time interval in S13, transmits a second radio signal in a third time interval in S14, and transmits a third radio signal in a fourth time interval in S15.

The UE U2 receives the target radio signal in S21, transmits the fourth radio signal in S22, receives the first radio signal in the first time interval in S23, conducts blind decoding for the first radio signal in the second time interval and receives the second radio signal in the third time interval in S24, and receives the third radio signal in the fourth time interval in S25.

In Embodiment 5, the blind decoding for the first radio signal is used by the U2 to recover a first signaling, the multi-antenna related receiving for the second radio signal by the U2 does not depend on the correct decoding of the first radio signal, the second radio signal and the third radio signal are transmitted by the same antenna port of the N1, the first signaling is used by the U2 to determine first scheduling information, the first scheduling information is shared by the second radio signal and the third radio signal, the first scheduling information includes at least one of {MCS, occupied time-frequency resource, retransmission procedure number, redundancy version, new data indicator, transmitting antenna port}, the end time of the second time interval is behind the start time of the third time interval, and the fourth time interval is behind the third time interval.

In one subembodiment, the first signaling is used by the U2 to determine the multi-antenna related receiving for the third radio signal.

In one subembodiment, steps in the box F0 exist, the channel measurement for the target radio signal is used by the U2 to trigger the fourth radio signal; and the fourth radio signal is used by the N1 to determine the multi-antenna related transmitting for the first radio signal.

In one subembodiment, the multi-antenna related receiving for the second radio signal by the U2 is related to the multi-antenna related receiving for the first radio signal by the U2.

In one subembodiment, the multi-antenna related receiving refers to a receiving beamforming vector.

In one subembodiment, the multi-antenna related receiving for the second radio signal by the U2 differs from the multi-antenna related receiving for the third radio signal by the U2, and the receiving beamforming vector for the third radio signal is used by the U2 to process the received second radio signal.

In one subembodiment, antenna ports used by the N1 to transmit the first radio signal, the second radio signal and the third radio signal are all related to a first reference signal spatially, the first reference signal is used by the N1 to determine the multi-antenna related transmitting for the first radio signal, the second radio signal and the third radio signal, and the first reference signal is used by the U2 to determine the multi-antenna related receiving for the first radio signal, the second radio signal and the third radio signal.

In one subembodiment, the antenna port used by the N1 to transmit the first radio signal is related to the first reference signal spatially, the antenna ports used by the N1 to transmit the second radio signal and the third radio signal are related to a second reference signal spatially, the first reference signal differs from the second reference signal, the first reference signal is used by the N1 to determine the multi-antenna related transmitting for the first radio signal, the first reference signal is used by the U2 to determine the multi-antenna related receiving for the first radio signal, the second reference signal is used by the N1 to determine the multi-antenna related transmitting for the second radio signal and the third radio signal, and the second reference signal is used by the U2 to determine the multi-antenna related receiving for the third radio signal.

If there is no conflict, the above embodiments can be arbitrarily combined.

Embodiment 6

Figure 6:
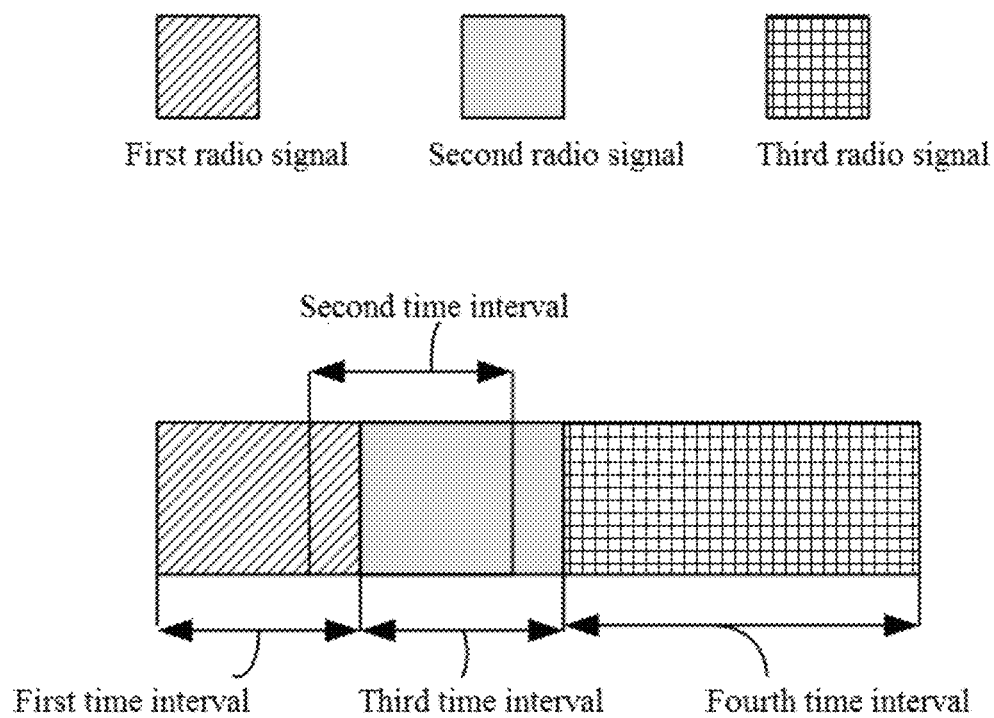
FIG. 6 is a diagram illustrating a first time interval, a second time interval, a third time interval and a fourth time interval according to one embodiment of the present disclosure.

Embodiment 6 illustrates a first time interval, a second time interval, a third time interval and a fourth time interval, as shown in FIG. 6. In FIG. 6, the rectangle filled by oblique lines represents a first radio signal, the grey rectangle represents a second radio signal, and the rectangle filled by squares represents a third radio signal.

In Embodiment 6, the first radio signal is transmitted in the first time interval, the second radio signal is transmitted in the third time interval, and the third radio signal is transmitted in the fourth time interval. The first time interval, the third time interval and the fourth time interval are arranged in sequence. The second time interval is used by the UE to conduct blind decoding for the first radio signal. The end time of the second time interval is behind the start time of the third time interval.

In one subembodiment, the end time of the second time interval is before the start time of the fourth time interval.

In one subembodiment, the start time of the second time interval is before the start time of the third time interval.

In one subembodiment, the first time interval, the third time interval and the fourth time interval include a positive integer number of multicarrier symbols respectively.

In one subembodiment, the first time interval, the third time interval and the fourth time interval are within one subframe. The subframe includes 14 OFDM symbols.

In one subembodiment, the first time interval, the third time interval and the fourth time interval are within one time slot. The time slot includes 7 OFDM symbols.

In one subembodiment, the first time interval, the third time interval and the fourth time interval are preconfigured.

In one subembodiment, the second time interval is related to the UE capability.

In one subembodiment, the second time interval is related to the air interface resource occupied by the PDCCH carried on the first radio signal.

Embodiment 7

Figure 7:
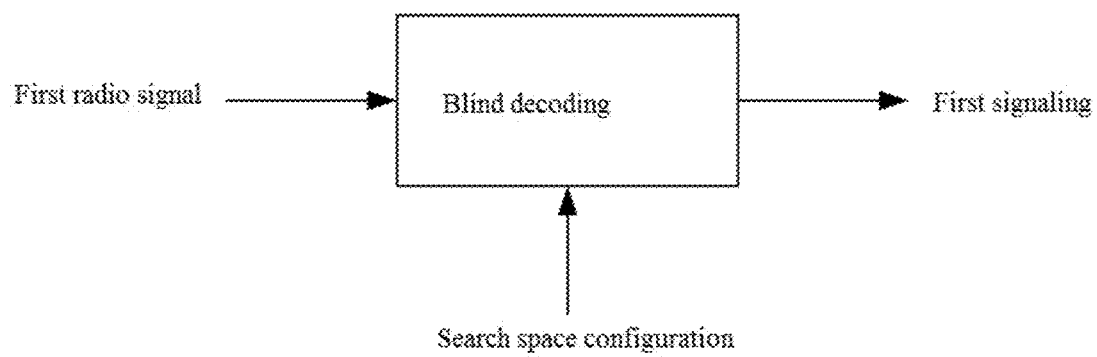
FIG. 7 is a diagram illustrating the recovering of a first signaling according to one embodiment of the present disclosure.

Embodiment 7 illustrates an example of the recovering of a first signaling, as shown in FIG. 7.

In embodiment 7, a blind decoding module is used by the UE to recover a first signaling from the first radio signal; the blind decoding module decodes the first radio signal based on a search space configuration; before successful decoding, it is indeterminate whether information is transmitted.

In one subembodiment, the first radio signal includes a positive integer number of multi-carrier symbols, the search space configuration is used by the UE to determine one or more search spaces, the search space includes multiple candidate resource configurations, and the UE attempts decoding on the multiple candidate configurations; after successful decoding, the first signaling is recovered.

In one subembodiment, the multiple candidate configurations are preconfigured to the UE by the base station.

In one subembodiment, identification related to the UE is used for determining the search space.

In one subembodiment, a Check Redundancy Code (CRC) is used for determining whether decoding is successful.

In one subembodiment, a first bit block includes the first signaling, the first bit block and the Cell Radio Network Temporary Identity (C-RNTI) of the UE are used for generating a 16-bit CRC bit string, the first bit block and the CRC bit string are connected in series and then subject to PDCCH channel coding, modulation, precoding, resource mapping, OFDM symbol generation to obtain a first radio signal, and the base station transmits the first radio signal to the UE.

In one subembodiment, the UE attempts decoding on multiple candidate configurations. A first configuration is one configuration of the multiple candidate configurations, and the UE attempts decoding based on the first configuration to obtain a first CRC bit string and a first information bit block. If the CRC bit string generated by the first information bit block and the C-RNTI is consistent with the first CRC bit string obtained above, the decoding is successful; otherwise, the decoding is failed.

Embodiment 8

Figure 8:
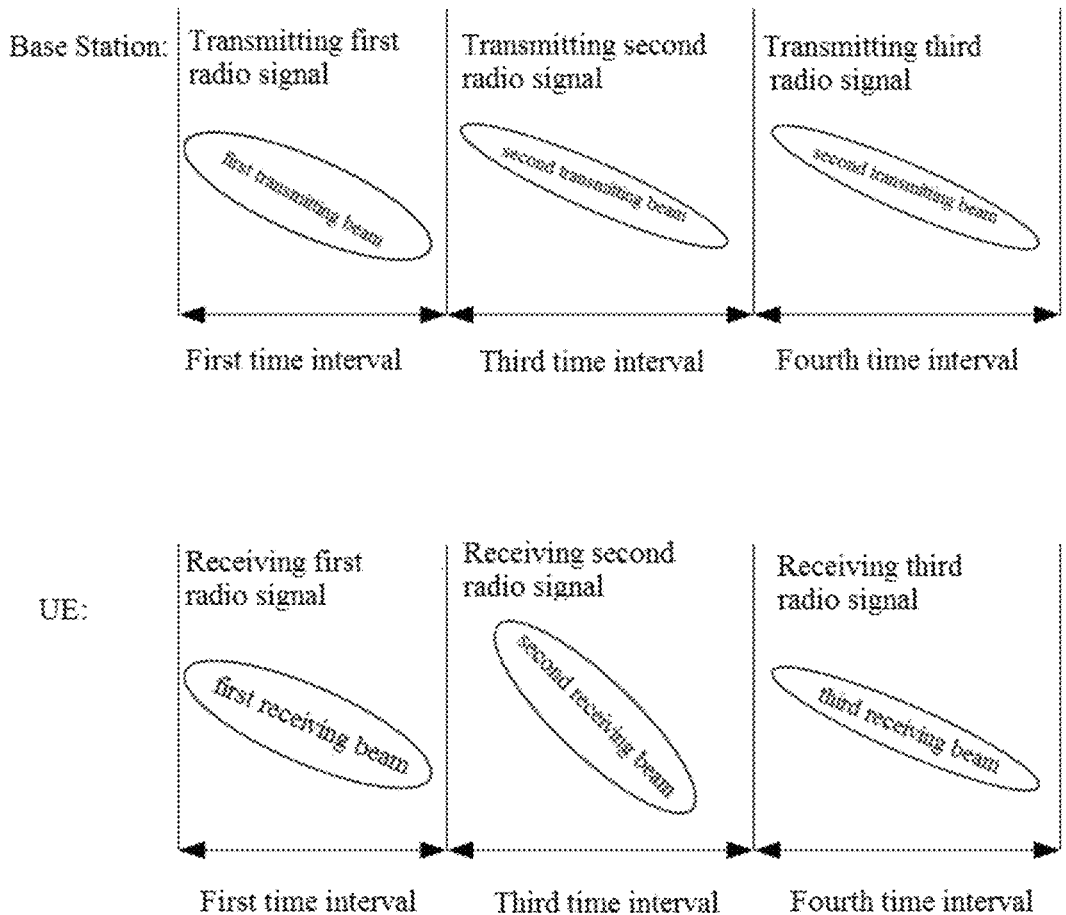
FIG. 8 is a diagram illustrating the multi-antenna related transmitting and receiving for a first radio signal, a second radio signal and a third radio signal according to one embodiment of the present disclosure.

Embodiment 8 illustrates an example of the multi-antenna related transmitting and receiving for a first radio signal, a second radio signal and a third radio signal, as shown in FIG. 8.

In Embodiment 8, a base station transmits a first radio signal, a second radio signal and a third radio signal in a first time interval, a third time interval and a fourth time interval respectively in sequence. A first transmitting beam is used for transmitting the first radio signal, and a second transmitting beam is used for transmitting the second radio signal and the third radio signal. A UE receives the first radio signal, the second radio signal and the third radio signal in the first time interval, the third time interval and the fourth time interval respectively in sequence. A first receiving beam is used for receiving the first radio signal, a second receiving beam is used for receiving the second radio signal, and a third receiving beam is used for receiving the third radio signal.

In one subembodiment, the transmitting beam and the receiving beam are analog beams formed by analog beamforming vectors.

In one subembodiment, the second receiving beam is preconfigured.

In one subembodiment, the first transmitting beam is recommended by the UE.

In one subembodiment, the first receiving beam is configured by the UE according to the recommended first transmitting beam.

In one subembodiment, the second receiving beam and the first receiving beam are the same.

In one subembodiment, the first transmitting beam and the second transmitting beam are the same.

In one subembodiment, the first receiving beam, the second receiving beam and the third receiving beam are the same.

In one subembodiment, the second receiving beam and the third receiving beam are the same.

In one subembodiment, the second receiving beam and the third receiving beam are different.

In one subembodiment, the first receiving beam and the third receiving beam are different.

In one subembodiment, the first receiving beam has a beam width greater than that of the third receiving beam.

In one subembodiment, the first transmitting beam and the second transmitting beam are different.

In one subembodiment, the first transmitting beam has a beam width greater than that of the second transmitting beam.

In one subembodiment, a first reference signal is a reference signal transmitted before the first radio signal, the first radio signal and the first reference signal are QCL, the first transmitting beam is a transmitting beam used for transmitting the first reference signal, and the first receiving beam is a receiving beam used for receiving the first reference signal.

In one subembodiment, a second reference signal is a reference signal transmitted before the third radio signal, the third radio signal and the second reference signal are QCL, the second transmitting beam is a transmitting beam used for transmitting the second reference signal, and the third receiving beam is a receiving beam used for receiving the second reference signal.

In one subembodiment, a third reference signal is a reference signal transmitted before the second radio signal, and the second receiving beam is a receiving beam used for receiving the third reference signal.

Embodiment 9

Figure 9:
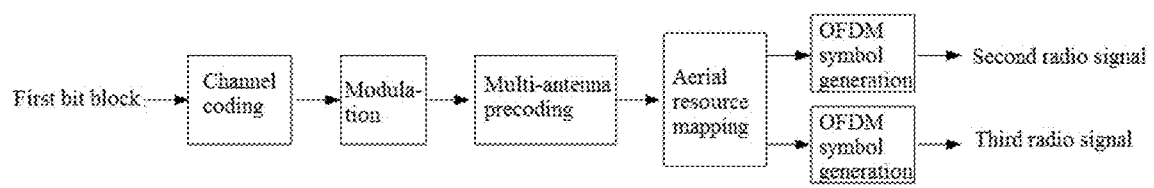
FIG. 9 is a diagram illustrating the generation of a second radio signal and a third radio signal according to one embodiment of the present disclosure.

Embodiment 9 illustrates an example of the generation of a second radio signal and a third radio signal, as shown in FIG. 9.

In Embodiment 9, a first bit block subjects to channel coding, modulation, multi-antenna precoding, air interface resource mapping and OFDM symbol generation to obtain the second radio signal and the third radio signal. The second radio signal and the third radio signal are transmitted by the same antenna port.

In one subembodiment, the second radio signal and the third radio signal include a positive integer number of OFDM symbols respectively. The second radio signal and the third radio signal are orthogonal in time domain.

In one subembodiment, the channel coding is data channel coding.

In one subembodiment, the first bit block includes an RRC signaling.

In one subembodiment, at least one bit of the first bit block is related to both the second radio signal and the third radio signal.

In one subembodiment, the same DMRS is used for demodulating the second radio signal and the third radio signal.

Embodiment 10

Figure 10:
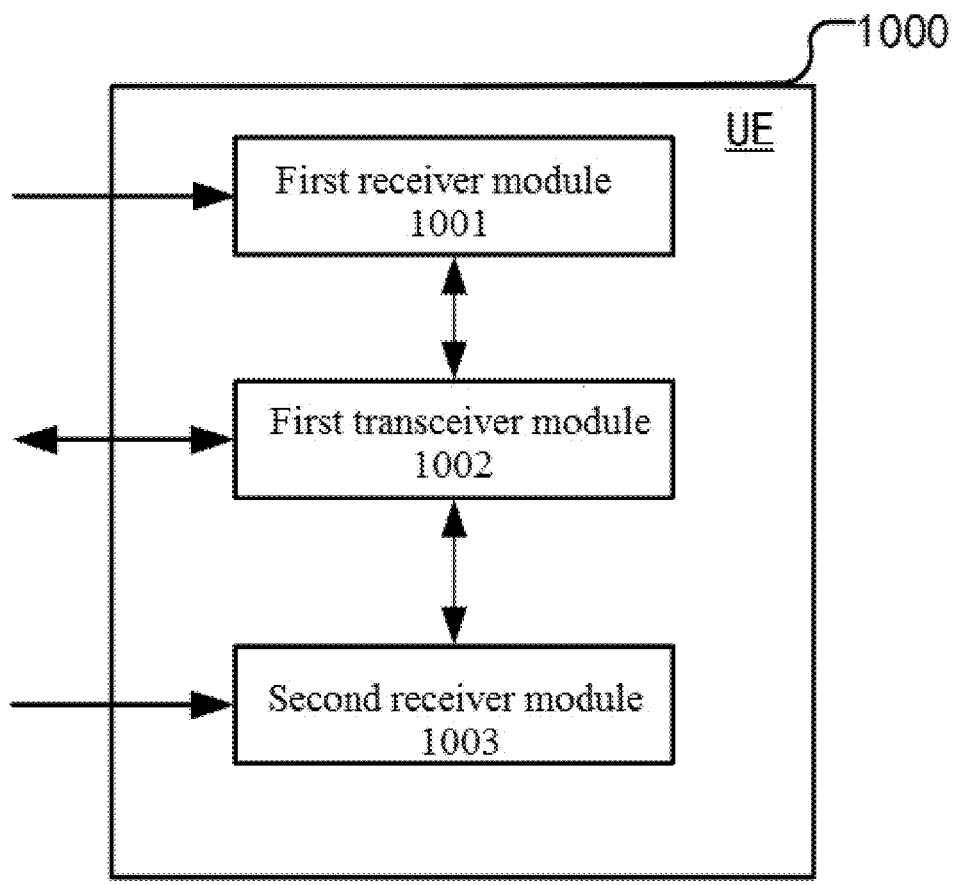
FIG. 10 is a structure block diagram illustrating a processing device used in a UE according to one embodiment of the present disclosure.

Embodiment 10 illustrates an example of a structure block diagram for a processing device in a UE, as shown in FIG. 10. In FIG. 10, the UE processing device 1000 is mainly composed of a first receiver module, a first transceiver module and a second receiver module.

In Embodiment 10, the first receiver module 1001 receives a first radio signal in a first time interval; the first transceiver module 1002 conducts blind decoding for the first radio signal in a second time interval and receives a second radio signal in a third time interval; and the second receiver module 1003 receives a third radio signal in a fourth time interval.

In Embodiment 10, the blind decoding for the first radio signal is used for recovering a first signaling, the multi-antenna related receiving for the second radio signal does not depend on the correct decoding of the first radio signal, the second radio signal and the third radio signal are transmitted by the same antenna port, the first signaling is used for determining first scheduling information, the first scheduling information is shared by the second radio signal and the third radio signal, the first scheduling information includes at least one of {MCS (Modulation Coding Scheme), occupied time-frequency resource, retransmission procedure number, redundancy version, new data indicator, transmitting antenna port}, the end time of the second time interval is behind the start time of the third time interval, and the fourth time interval is behind the third time interval.

In one subembodiment, the first signaling is used for determining the multi-antenna related receiving for the third radio signal.

In one subembodiment, the first transceiver module 1002 is further configured to receive a target radio signal and transmit a fourth radio signal; wherein the channel measurement for the target radio signal is used for triggering the fourth radio signal, and the fourth radio signal is used for determining the multi-antenna related transmitting for the first radio signal.

In one subembodiment, the multi-antenna related receiving for the second radio signal is related to the multi-antenna related receiving for the first radio signal.

In one subembodiment, the multi-antenna related receiving refers to a receiving beamforming vector.

In one subembodiment, the multi-antenna related receiving for the second radio signal differs from the multi-antenna related receiving for the third radio signal, and the receiving beamforming vector for the third radio signal is used for processing the received second radio signal.

In one subembodiment, antenna ports used for transmitting the first radio signal, the second radio signal and the third radio signal are all related to a first reference signal spatially, the first reference signal is used for determining the multi-antenna related transmitting and receiving for the first radio signal, the second radio signal and the third radio signal.

In one subembodiment, the antenna port used for transmitting the first radio signal is related to the first reference signal spatially, the antenna ports used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

Embodiment 11

Figure 11:
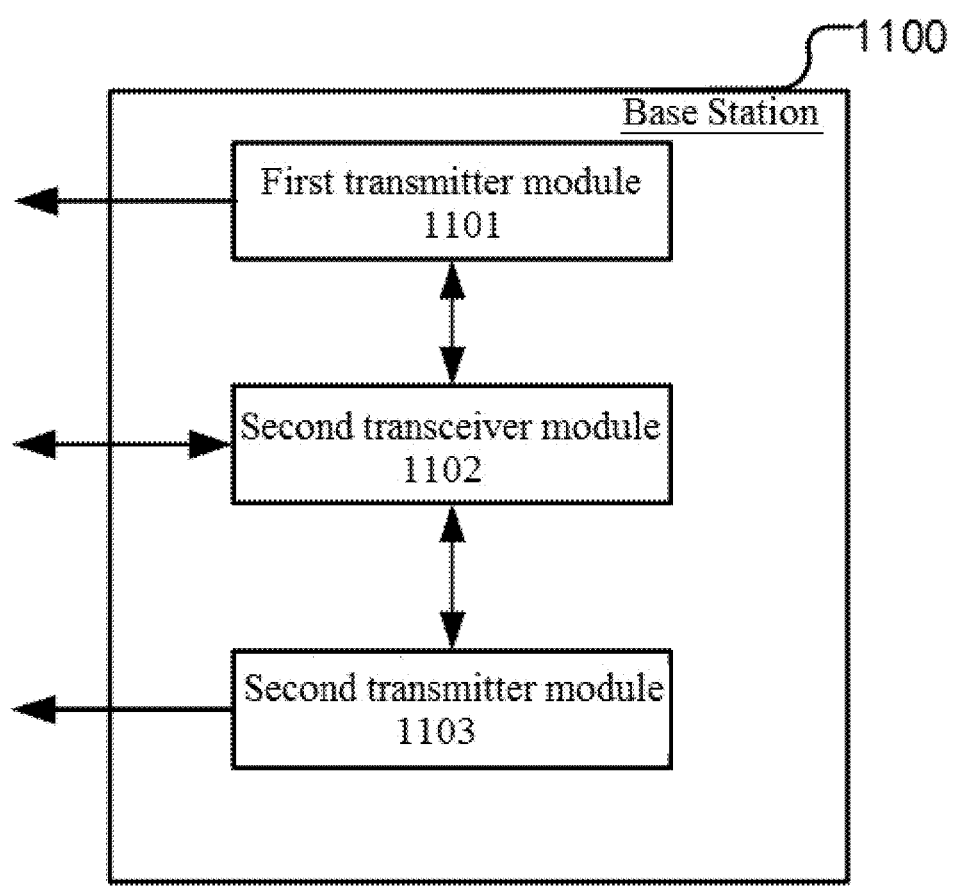
FIG. 11 is a structure block diagram illustrating a processing device used in a base station according to one embodiment of the present disclosure.

Embodiment 11 illustrates an example of a structure block diagram for a processing device in a base station, as shown in FIG. 11. In FIG. 11, the base station processing device 1100 is mainly composed of a first transmitter module 1101, a second transceiver module 1102 and a second transmitter module 1103.

In Embodiment 11, the first transmitter module 1101 transmits a first radio signal in a first time interval; the second transceiver module 1102 transmits a second radio signal in a third time interval; and the second transmitter module 1103 transmits a third radio signal in a fourth time interval.

In one subembodiment, the first signaling is used for determining the multi-antenna related receiving for the third radio signal.

In one subembodiment, the second transceiver module 1102 is configured to transmit a target radio signal and receive a fourth radio signal; wherein the channel measurement for the target radio signal is used for triggering the fourth radio signal, and the fourth radio signal is used for determining the multi-antenna related transmitting for the first radio signal.

In one subembodiment, the multi-antenna related receiving for the second radio signal is related to the multi-antenna related receiving for the first radio signal.

In one subembodiment, the multi-antenna related receiving refers to a receiving beamforming vector.

In one subembodiment, the multi-antenna related receiving for the second radio signal differs from the multi-antenna related receiving for the third radio signal, and the receiving beamforming vector for the third radio signal is used for processing the received second radio signal.

In one subembodiment, antenna ports used for transmitting the first radio signal, the second radio signal and the third radio signal are all related to a first reference signal spatially, the first reference signal is used for determining the multi-antenna related transmitting and receiving for the first radio signal, the second radio signal and the third radio signal.

In one subembodiment, the antenna port used for transmitting the first radio signal is related to the first reference signal spatially, the antenna ports used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station and radio communication equipment.

The above are merely the embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a first radio signal in a first time interval;
   conducting blind decoding for the first radio signal in a second time interval, and receiving a second radio signal in a third time interval; and
   receiving a third radio signal in a fourth time interval;
   wherein the blind decoding for the first radio signal is used for recovering a first signaling, a multi-antenna related receiving for the second radio signal does not depend on the correct decoding of the first radio signal, the second radio signal and the third radio signal are transmitted by a same antenna port, the first signaling is used for determining first scheduling information, the first scheduling information is shared by the second radio signal and the third radio signal, the first scheduling information comprises at least one of {MCS (Modulation Coding Scheme), occupied time-frequency resource, retransmission procedure number, redundancy version, new data indicator, transmitting antenna port}, a end time of the second time interval is behind a start time of the third time interval, and the fourth time interval is behind the third time interval; and
   wherein antenna ports used for transmitting the first radio signal, the second radio signal and the third radio signal are all related to a first reference signal spatially, the first reference signal is used for determining a multi-antenna related transmitting and receiving for the first radio signal, the second radio signal and the third radio signal; or, an antenna port used for transmitting the first radio signal is related to the first reference signal spatially, the same antenna port used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

2. The method according to claim 1, wherein the first signaling is used for determining the multi-antenna related receiving for the third radio signal.

3. The method according to claim 1, comprising:
   receiving a target radio signal; and
   transmitting a fourth radio signal;
   wherein the channel measurement for the target radio signal is used for triggering the fourth radio signal; and the fourth radio signal is used for determining the multi-antenna related transmitting for the first radio signal.

4. The method according to claim 1, wherein the multi-antenna related receiving for the second radio signal is related to the multi-antenna related receiving for the first radio signal.

5. A method in a base station device for wireless communication, comprising:
   transmitting a first radio signal in a first time interval;
   transmitting a second radio signal in a third time interval; and
   transmitting a third radio signal in a fourth time interval;
   wherein a receiver of the first radio signal conducts blind decoding for the first radio signal in a second time interval, the blind decoding for the first radio signal is used for recovering a first signaling, a multi-antenna related receiving for the second radio signal does not depend on the correct decoding of the first radio signal, the second radio signal and the third radio signal are transmitted by a same antenna port, the first signaling is used for determining first scheduling information, the first scheduling information is shared by the second radio signal and the third radio signal, the first scheduling information comprises at least one of {MCS (Modulation Coding Scheme), occupied time-frequency resource, retransmission procedure number, redundancy version, new data indicator, transmitting antenna port}, a end time of the second time interval is behind a start time of the third time interval, and the fourth time interval is behind the third time interval; and
   wherein antenna ports used for transmitting the first radio signal, the second radio signal and the third radio signal are all related to a first reference signal spatially, the first reference signal is used for determining a multi-antenna related transmitting and receiving for the first radio signal, the second radio signal and the third radio signal; or, an antenna port used for transmitting the first radio signal is related to the first reference signal spatially, the same antenna port used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

6. The method according to claim 5, wherein the first signaling is used for determining the multi-antenna related receiving for the third radio signal.

7. The method according to claim 5, comprising:
transmitting a target radio signal; and
receiving a fourth radio signal;
wherein the channel measurement for the target radio signal is used for triggering the fourth radio signal; and the fourth radio signal is used for determining the multi-antenna related transmitting for the first radio signal.

8. The method according to claim 5, wherein the multi-antenna related receiving for the second radio signal is related to the multi-antenna related receiving for the first radio signal.

9. A UE for wireless communication, comprising the following modules:
a first receiver module, to receive a first radio signal in a first time interval;
a first transceiver module, to conduct blind decoding for the first radio signal in a second time interval and receive a second radio signal in a third time interval; and
a second receiver module, to receive a third radio signal in a fourth time interval;
wherein the blind decoding for the first radio signal is used for recovering a first signaling, a multi-antenna related receiving for the second radio signal does not depend on the correct decoding of the first radio signal, the second radio signal and the third radio signal are transmitted by a same antenna port, the first signaling is used for determining first scheduling information, the first scheduling information is shared by the second radio signal and the third radio signal, the first scheduling information comprises at least one of {MCS (Modulation Coding Scheme), occupied time-frequency resource, retransmission procedure number, redundancy version, new data indicator, transmitting antenna port}, a end time of the second time interval is behind a start time of the third time interval, and the fourth time interval is behind the third time interval; and
wherein antenna ports used for transmitting the first radio signal, the second radio signal and the third radio signal are all related to a first reference signal spatially, the first reference signal is used for determining a multi-antenna related transmitting and receiving for the first radio signal, the second radio signal and the third radio signal; or, an antenna port used for transmitting the first radio signal is related to the first reference signal spatially, the same antenna port used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

10. The UE according to claim 9, wherein the first signaling is used for determining the multi-antenna related receiving for the third radio signal.

11. The UE according to claim 9, wherein the first transceiver module receives a target radio signal and transmits a fourth radio signal; wherein the channel measurement for the target radio signal is used for triggering the fourth radio signal, and wherein the fourth radio signal is used for determining the multi-antenna related transmitting for the first radio signal.

12. The UE according to claim 9, wherein the multi-antenna related receiving for the second radio signal is related to the multi-antenna related receiving for the first radio signal.

13. A base station device for wireless communication, comprising the following modules:
a first transmitter module, to transmit a first radio signal in a first time interval;
a second transceiver module, to transmit a second radio signal in a third time interval; and
a second transmitter module, to transmit a third radio signal in a fourth time interval;
wherein a receiver of the first radio signal conducts blind decoding for the first radio signal in a second time interval, the blind decoding for the first radio signal is used for recovering a first signaling, a multi-antenna related receiving for the second radio signal does not depend on the correct decoding of the first radio signal, the second radio signal and the third radio signal are transmitted by a same antenna port, the first signaling is used for determining first scheduling information, the first scheduling information is shared by the second radio signal and the third radio signal, the first scheduling information comprises at least one of {MCS (Modulation Coding Scheme), occupied time-frequency resource, retransmission procedure number, redundancy version, new data indicator, transmitting antenna port}, a end time of the second time interval is behind a start time of the third time interval, and the fourth time interval is behind the third time interval; and
wherein antenna ports used for transmitting the first radio signal, the second radio signal and the third radio signal are all related to a first reference signal spatially, the first reference signal is used for determining a multi-antenna related transmitting and receiving for the first radio signal, the second radio signal and the third radio signal; or, an antenna port used for transmitting the first radio signal is related to the first reference signal spatially, the same antenna port used for transmitting the second radio signal and the third radio signal are related to a second reference signal spatially, the first reference signal differs from the second reference signal, the first reference signal is used for determining the multi-antenna related transmitting and receiving for the first radio signal, and the second reference signal is used for determining the multi-antenna related transmitting for the second radio signal and the multi-antenna related transmitting and receiving for the third radio signal.

14. The base station device according to claim 13, wherein the first signaling is used for determining the multi-antenna related receiving for the third radio signal.

15. The base station device according to claim 13, wherein the second transceiver module transmits a target radio signal and receives a fourth radio signal; wherein the channel measurement for the target radio signal is used for triggering the fourth radio signal, and wherein the fourth radio signal is used for determining the multi-antenna related transmitting for the first radio signal.

16. The base station device according to claim 13, wherein the multi-antenna related receiving for the second radio signal is related to the multi-antenna related receiving for the first radio signal.

* * * * *